United States Patent
Tseng

[11] Patent Number: 5,834,741
[45] Date of Patent: Nov. 10, 1998

[54] TEMPERATURE CONTROL HEATER WITH SUBMERSIBLE GLASS TUBE LIQUID CRYSTAL (LSD) DISPLAY

[76] Inventor: Chuan-Tseng Tseng, No. 73, Sec. 1, Chung-Cheng Rd., Hu-Kou Hsiang, Hsin-Chu Hsien, Taiwan

[21] Appl. No.: 905,354

[22] Filed: Aug. 4, 1997

[30] Foreign Application Priority Data

Aug. 6, 1996 [TW] Taiwan .................................. 85211946

[51] Int. Cl.[6] ................................. H05B 1/02; F24H 9/12
[52] U.S. Cl. ......................... 219/506; 219/505; 219/497; 219/523; 392/498; 392/501
[58] Field of Search ..................................... 219/506, 505, 219/497, 494, 523; 392/498, 501, 502, 523

[56] References Cited

U.S. PATENT DOCUMENTS

| | | |
|---|---|---|
| 3,890,486 | 6/1975 | Fitzgerald .............................. 219/523 |
| 4,812,626 | 3/1989 | Strada ..................................... 219/523 |
| 5,266,772 | 11/1993 | Reed .................................... 219/137 R |
| 5,392,380 | 2/1995 | Tsai ........................................ 392/498 |
| 5,444,227 | 8/1995 | Chestnut ................................. 219/506 |
| 5,465,014 | 11/1995 | Arvisati .................................. 307/117 |
| 5,568,587 | 10/1996 | Marioni ................................... 392/498 |

Primary Examiner—Mark H. Paschall
Attorney, Agent, or Firm—Bacon & Thomas, PLLC

[57] ABSTRACT

A temperature control heater with sink type glass tube liquid crystal (LCD) display, especially relates to a temperature control heater having a structure for display the temperature precisely, the mainly structure thereof is comprised of a single opening tube, and a liquid crystal (LCD) display temperature control circuit board and a heating coil set is arranged with said tube, finally a plug and a cover are used to tightly seal the tube.

10 Claims, 4 Drawing Sheets

5,834,741

TEMPERATURE CONTROL HEATER WITH SUBMERSIBLE GLASS TUBE LIQUID CRYSTAL (LSD) DISPLAY

BACKGROUND OF THE INVENTION

1. Field of the Invention

The present invention is related to a temperature control heater with sink type glass tube liquid crystal (LCD) display, especially to a temperature control heater having a structure for display the temperature precisely.

2. Description of the Prior Art

The breeding of aquarium fish is favored by many people. Other than making the environment beautiful, it is also silent and easy to treat the excrement. Thus, recently, aquarium fish are widely bred.

It is important to maintain the temperature of the fish jar so to prevent the fish from dying or becoming sick. A glass tube with a heating coil and double metal pieces is used, in which the temperature is controlled by adjusting the distance between the double metal pieces and a copper piece so to heat the lower temperature of the water, but in the prior design a temperature meter is not used to show the exact temperature.

In the prior design, it has the defect that the temperature within a heating range has not been indicated, but the prior double metal piece heating method is still used, thus the precision of the temperature control is apparently not sufficient, while in another prior design, the defect is solved by an electronic temperature controller so to derive a preferred controlled temperature. However, the structure thereof is more complicated than that in the prior art, nevertheless, there are three conducting wires inducing from a conductor and each is debated for different functions. Thus for a fish jar matching the natural environment, such design is over complicated and the harmonic property with the conventional fish jar will be destroyed, which will trouble the user.

SUMMARY OF THE INVENTION

Accordingly, since there are still some defects in the prior fish jar, the inventor of the present invention has study for a long period to improve said defects, and a newly designed temperature control heater with sink type glass tube liquid crystal (LCD) display is invented thereby.

The main object of the present invention is to provide a temperature control heater with sink type glass tube liquid crystal (LCD) display, the main structure thereof including a single open tube, a liquid crystal (LCD) display temperature control circuit board and a heating coil set is arranged with said tube. A plug and a cover are used to tightly seal the tube. The plug has a through hole and a concave hole the upper rim of which is connected with a soft convex button and a long hole for inserting a circuit board is installed on the bottom of the plug near the center thereof, while the circuit board is inserted on the plug, a power line is conducted therefrom, which will penetrate through the plug and the cover, and a conducting rod is penetrated through a concave hole and one end thereof is resisted against the control button of the circuit board. When the power is fed from a power line, by the detection of the control button on the circuit board and the sensor thereof, the heater may sense the temperature precisely and heat the object, and the procedure is displayed on the liquid crystal (LCD) display screen so that the user may clearly know the temperature so that another temperature meter is unnecessary. Moreover, the whole structure is simple and integral, while the device is easy to use. The integral sense of the fish jar will not be destroyed.

BRIEF DESCRIPTION OF THE DRAWINGS

The invention, as well as its many advantages, may be further understood by the following description and drawings in which.

DETAILED DESCRIPTION OF THE PREFERRED EMBODIMENT

Figure 1:
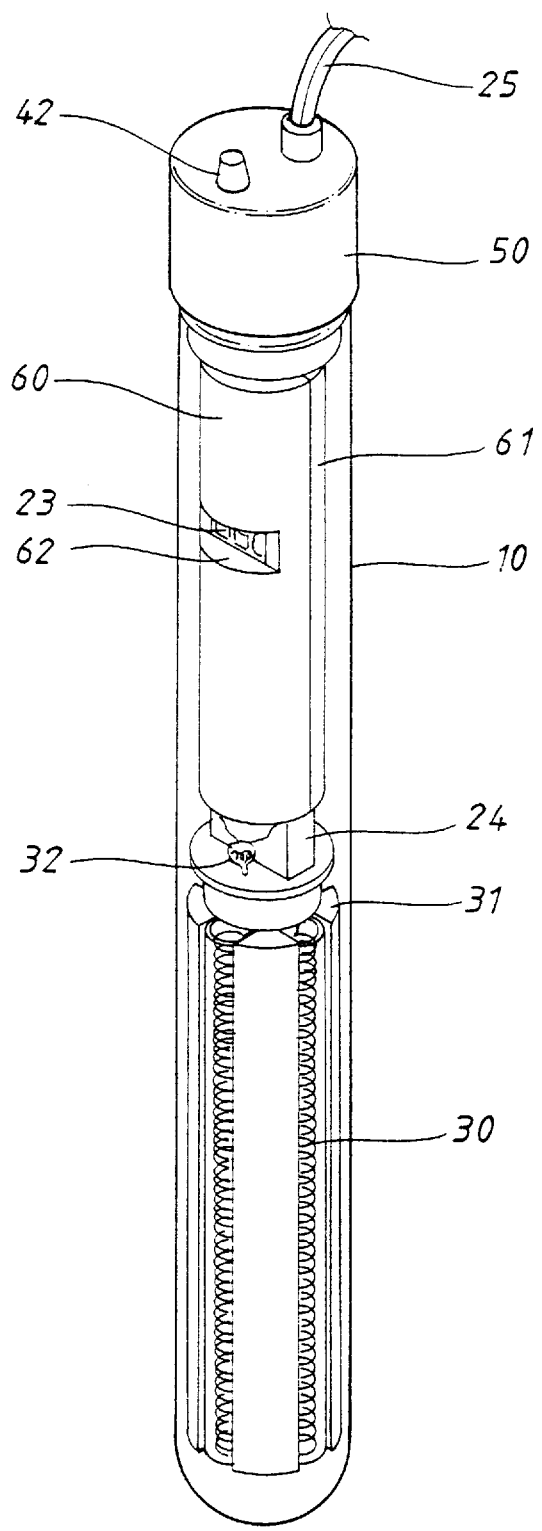
FIG. 1 is a perspective view of the embodiment in the present invention.
Figure 2:
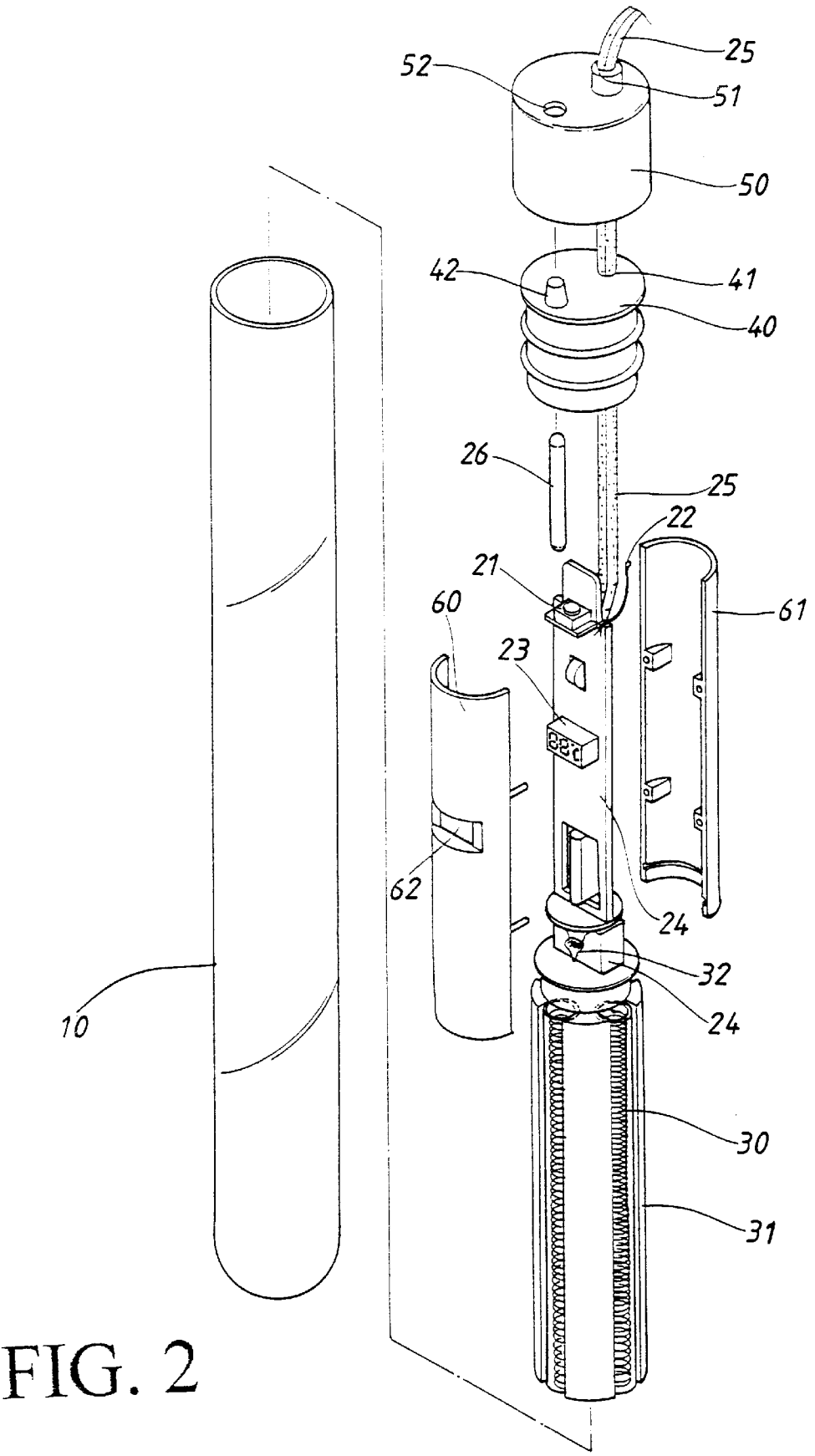
FIG. 2 is a explode view of the embodiment in the present invention.

Shown in the perspective view of FIG. 1 and the explode view of FIG. 2 is the temperature control heater with sink type glass tube liquid crystal (LCD) display mainly comprising a tube 10, a control circuit board 20, a heating coil set 30, a plug 40, a cover 50, wherein said tube 10 is formed as a glass tube with single opening and a CPU control circuit is mainly installed on the control circuit board 20 with a control button 21, a temperature sensor 22 and a liquid crystal (LCD) display 23, wherein said circuit board 20 is enclosed by a first half-cover 60 having a window 62, and a second half-cover 61. Said circuit board 20 is connected with a heating coil set 30 by a conducting wire. Said heating coil set 30 may be engaged with an insulated ceramic 31 of aluminum oxide ($Al_2O_3$) and is connected with neon lamp 32. As the coil 30 is heated, meanwhile the neon lamp 32 is lighted. The plug 40 is made of a cylinder of soft silicon material with a downward penetrating hole 41 for being penetrating by a power line 25, and is installed with a soft convex button 42 having a concave hole (not shown in the figure) for insertion of a rod 26, while another long concave hole is installed on the bottom of the plug 40 (not shown in the figure), which may be exactly inserted by the circuit board 20. The plug 50 is a hard cylinder cover on the upper surface of which is pre-installed with two holes 51 and 52 which are corresponding to the penetrating hole 41 and the convex button 42 of the plug 40 and are penetrated through by a power wire 20 and a convex button 40, respectively.

Figure 3:
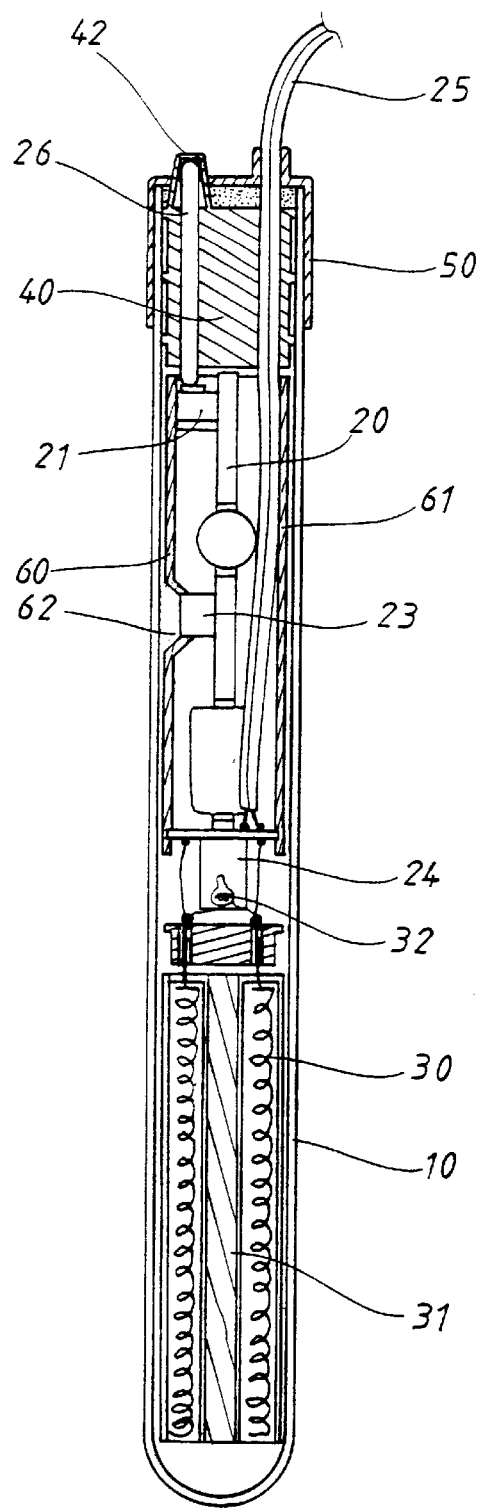
FIG. 3 is a sectional view of the embodiment in the present invention.

Now referring to FIG. 3, in which the tube 10 is located in front of the control circuit board 20 having a liquid crystal (LCD) therein and the heating coil 30. The circuit board 30 is inserted into the long convex hole below the plug 40 in advance and conducting rod 26 is received within said concave hole of button 42 another end thereof is rested against the control button 21 of the circuit board 20. When the circuit board 20 and the heating coil 30 are arranged within said tube 10, a power wire 25 extended from said circuit board 20 is penetrated through and plug 40 and the cover 50, then a water proof silicon adhesive is filled into the sealing opening of the tube, then a cover 50 is covered so that the tube 20 is sealed sufficiently, while the user may control the tube by pushing button 42. When the power is input from the power wire 25, by the detecting of the control button 21 and the sensor 22 arranged on the circuit board 20, the heater may sense the ambient temperature precisely and heat the object, and the process may display on the liquid crystal (LCD) 23 in order that the user may fully known the condition, thus another temperature meter is unnecessary. Furthermore, the whole structure is simple and integrally formed, and the device is easy to use and the integral sense of the fish jar will not be destroyed, in which the main control process of the CPU is described in the following:

1. The power is fed into the control circuit, now the liquid crystal (LCD) shows that the initial temperature of the CPU is 28° C., this temperature has been set as it is initially manufactured and is stored in a EEPROM (memory IC).

2. Touching a convex button, the liquid crystal (LCD) is begun to flash and now the set temperature may be adjusted. Each time the button is pushed, the set temperature will increased by 1° C., by repeating this process, the temperature may be adjusted within the range of 10°–40° C. After the convex button is released through 5 sec., the liquid crystal (LCD) is jumped to display the current temperature, now the set temperature is stored within an EEPROM (memory IC). After the power is supplied after it has been tripped, the set temperature in the EEPROM will not be changed unless the convex button is pushed again.

3. After displaying current temperature by three minutes., the CPU compares the environment temperature and the set temperature, and from the comparison the CPU determines whether the heat produced is being transferred to the water, so that the user has sufficient time to put the heater into water and need not be concerned with the probable danger.

4. After starting to heat water, the second temperature comparison will be performed after the heating process is performed by at least one minute. If the temperature is smaller than said set temperature, then the heating process is continuous with the same procedure, and the comparison is performed every one minutes. If the water temperature is higher than the set temperature, then the comparison is stopped.

5. After the heating process is stopped, the temperature comparison is performed every one minutes. If the temperature is smaller than the set temperature, the step 4 is repeated.

Figure 4:
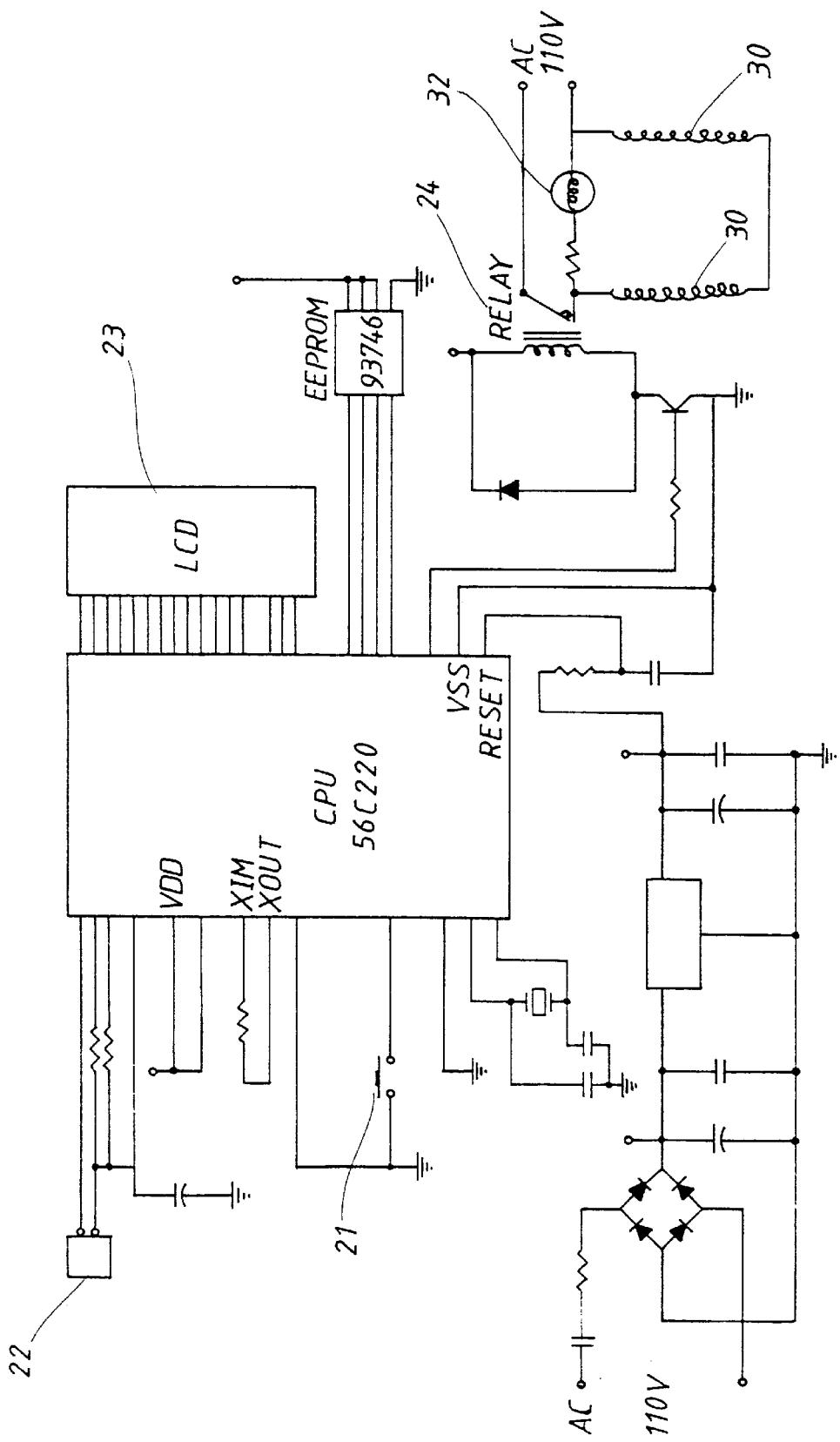
FIG. 4 is the circuit diagram of the preferred embodiment in the present invention.

Referring to FIG. 4, in the active circuit of the present invention, the 110V power source is conducted into the circuit board, and the voltage is reduced by a rectifier and filter regulator, then the power is input to the CPU and the heating coil set. The CPU is adjusted by a temperature sensor and a control button, thus the CPU will transfer the signal to the liquid crystal (LCD) for displaying, and a relay 24 is controlled synchronously for switching the heating coil set. Therefore, the drawback in the prior art that the TRIAC will be overheated is avoided, and the exactness of the inner sensor is increased.

As described hereinabove, in the present invention, the production and practical usage of this newly structure and the functions thereof are more complete than before, and the heater has a new usage as described in the present invention, thus the user is more convenient to use the present invention.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A temperature control heater with a submersible glass tube and liquid crystal display comprising:

a tube, a power source, a control button, a liquid crystal display, a temperature sensor, a heating coil set, a control circuit board having a control circuit mounted thereon, a plug, and a cover, wherein said tube has an open end and a closed end;

said control button, said liquid crystal display and said temperature sensor are mounted to said control circuit board, said control circuit board is mounted to said plug, and said plug forms a watertight seal at said open end of said tube, and said heating coil set is disposed adjacent the circuit board; and said power source, said control button, said liquid crystal display, said temperature sensor, said heating coil set, and said control circuit are arranged inside said tube and electrically interconnected so that activation by a user of said control button energizes said control circuit, thereby allowing said temperature sensor to generate an ambient temperature signal representing an ambient temperature value which is conducted to said control circuit, said control circuit thereby controlling energization of said heating coil in response to said signal and causing said liquid crystal display to indicate said ambient temperature value.

2. The temperature control heater of claim 1, wherein said tube is a glass tube.

3. The temperature control heater of claim 1, wherein said control circuit board has a cover including a window for viewing said temperature value on said liquid crystal display.

4. The temperature control heater of claim 1, wherein said heating coil set includes a ceramic insulator of aluminum oxide and a neon lamp, wherein said ceramic insulator supports said heating coil set and said heating coil set is electrically connected in parallel with said neon lamp.

5. The temperature control heater of claim 1, wherein said plug is made of soft silicon material and includes:

a through hole suitable for conveying a power line and forming a watertight seal with said power line; and a through hole for receiving a soft outwardly facing convex button and arranged to form a watertight seal with said button, the button being arranged to receive a rod within its convex side, wherein said rod is arranged to transmit actuating movement of said soft convex button to said control button and said power lines are electrically connected to said control circuit.

6. The temperature control heater of claim 1, wherein said cover is arranged to cover said plug, said cover includes a through hole for conveying said power line and a through hole for receiving said outwardly facing convex button.

7. The temperature control heater of claim 1, wherein said liquid crystal display has a back scattering effect.

8. The temperature control heater of claim 1 further including a memory device for permanently storing a set temperature value inputted by a user, said set temperature value being adjusted by a predetermined sequence of control button activations, said memory device being electrically connected to said control circuit, wherein said set temperature value remains retrievable from said permanent storage after power has been interrupted and reestablished.

9. The temperature control heater of claim 8, wherein the memory device is an EEPROM.

10. The temperature control heater of claim 8, wherein said control circuit causes said liquid crystal display to indicate one of said set temperature value and said ambient temperature value.

* * * * *